US010692160B1

(12) United States Patent
Lyons et al.

(10) Patent No.: US 10,692,160 B1
(45) Date of Patent: Jun. 23, 2020

(54) PROPERTY DAMAGE ESTIMATOR

(71) Applicant: STATE FARM MUTUAL AUTOMOBILE INSURANCE COMPANY, Bloomington, IL (US)

(72) Inventors: Roxane Lyons, Chenoa, IL (US); Andrew Crouthamel, Normal, IL (US); Aaron Brucker, Bloomington, IL (US); Gregory D. Carter, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 705 days.

(21) Appl. No.: 15/398,306

(22) Filed: Jan. 4, 2017

(51) Int. Cl.
*G06Q 50/16* (2012.01)
*G06K 9/00* (2006.01)

(52) U.S. Cl.
CPC ......... *G06Q 50/163* (2013.01); *G06K 9/0063* (2013.01)

(58) Field of Classification Search
CPC ....... G06Q 50/163; G06Q 40/08; G06Q 10/10
See application file for complete search history.

(56) References Cited

U.S. PATENT DOCUMENTS

| | | | | |
|---|---|---|---|---|
| 8,756,085 B1 * | 6/2014 | Plummer | ............. | H04N 13/204 705/4 |
| 9,152,863 B1 * | 10/2015 | Grant | ..................... | G06Q 40/08 |
| 9,563,201 B1 * | 2/2017 | Tofte | .................... | G05D 1/0038 |
| 9,609,288 B1 * | 3/2017 | Richman | ................ | H04N 7/183 |
| 9,639,960 B1 * | 5/2017 | Loveland | ................ | G01C 11/02 |
| 9,894,327 B1 * | 2/2018 | Jacob | ..................... | H04N 7/185 |
| 2008/0262789 A1 * | 10/2008 | Pershing | ................ | G06Q 40/08 702/156 |
| 2009/0265193 A1 * | 10/2009 | Collins | .............. | G06Q 30/0185 705/4 |
| 2010/0215212 A1 * | 8/2010 | Flakes, Jr. | ........... | G01M 5/0025 382/100 |
| 2012/0223965 A1 * | 9/2012 | Pershing | ............. | G06F 17/5004 345/630 |

(Continued)

OTHER PUBLICATIONS

N Liba and J Berg-Jürgens, "Accuracy of Orthomosaic Generated by Different Methods in Example of UAV Platform MUST Q", 2015 IOP Conf. Ser.: Mater. Sci. Eng. 96 012041 (Year: 2015).*

(Continued)

*Primary Examiner* — Paul R Fisher
*Assistant Examiner* — Andrew Chase Lakhani
(74) *Attorney, Agent, or Firm* — Marshall, Gerstein & Borun LLP; Randall G. Rueth

(57) ABSTRACT

Systems and approaches for estimating damage to property are described. In one approach, a damage estimation device is activated using a mobile computing device. This damage estimation device may then automatically capture (e.g., using an imaging sensor) a plurality of images of the damaged property. The damage estimation device may then calculate at least one characteristic of the damaged property from the plurality of captured images and further calculate at least one characteristic of the damage to the damaged property from the plurality of captured images. A repair estimate may then be calculated based at least on the at least one characteristic of the damaged property and the at least one characteristic of the damage. This repair estimate may then be transmitted.

13 Claims, 9 Drawing Sheets

(56) References Cited

U.S. PATENT DOCUMENTS

| | | | | |
|---|---|---|---|---|
| 2013/0226515 A1* | 8/2013 | Pershing | ................. | G06F 17/00 |
| | | | | 702/156 |
| 2014/0240498 A1* | 8/2014 | Ohtomo | ................. | B64D 47/08 |
| | | | | 348/144 |
| 2015/0019267 A1* | 1/2015 | Prieto | ................. | G06Q 10/067 |
| | | | | 705/4 |
| 2015/0348204 A1* | 12/2015 | Daues | ................... | G06Q 40/08 |
| | | | | 705/4 |
| 2016/0004795 A1* | 1/2016 | Novak | ................... | G06F 30/20 |
| | | | | 703/1 |
| 2016/0117853 A1* | 4/2016 | Zhong | ................... | B64C 39/024 |
| | | | | 345/634 |
| 2016/0307447 A1* | 10/2016 | Johnson | ................. | B60L 58/12 |
| 2016/0313736 A1* | 10/2016 | Schultz | ............... | G08G 5/0039 |
| 2016/0321503 A1* | 11/2016 | Zhou | ................... | G05D 1/0061 |
| 2017/0206648 A1* | 7/2017 | Marra | ................... | B64C 39/024 |
| 2017/0270612 A1* | 9/2017 | Howe | ................... | G06Q 40/08 |

OTHER PUBLICATIONS

Popescu, Dan; Ichim, Loretta; Stiocan, Florin, "Unmaned Aerial Vehicle Systems for Remote Estimation of Flooded Areas Based on Complex Image Processing", Sensors, 2017, 17, 446, doi: 10.3390/s17030446, published Feb. 23, 2017. (Year: 2017).*

Opfer, Neil and Dr. Shields, David, "Unmanned Aerial Vehicle Applications and Issues for Construction", 121st ASEE Annual Conference and Exposition, Paper ID 10444, Jun. 15-18, 2014. (Year: 2014).*

* cited by examiner

PROPERTY DAMAGE ESTIMATOR

FIELD OF THE DISCLOSURE

The present disclosure generally relates to damage estimation and, more particularly, to systems and approaches for estimating property damage using unmanned aerial vehicles.

BACKGROUND

Damage may occur to a property under a number of circumstances. For example, acts of nature such as inclement weather, animals, and/or human-involved accidents may cause structural damage to a property and thus require restorative repairs. Roofing and/or canopy structures provide essential protection and security to a property, and accordingly, their upkeep is of particular importance to maintain the appropriate quality of the underlying structure.

In the event that property damage occurs, inspectors are tasked with assessing the extent of the damage to determine appropriate payments to be made to the property owner to complete repairs. Generally speaking, inspectors must obtain measurements and images of damage (e.g., the size of the damaged area, the quantity of damaged structures, and the like) as well as other relevant environmental information to properly assess suitable payments. In the event of roof damage, the assessor may need to climb onto the roof to measure the damage and other roof features such as the slope and materials used. This process may be time-consuming, costly, and potentially dangerous to the inspector depending on the complexity and uniqueness of the roof and/or the property. The inspector may also need to use specialized equipment to measure various characteristics of the damaged property. Alternatively, measurements can be purchased from third parties. Depending on the complexity of the structure, the measurements may be exceedingly costly.

The measurements and images are then manually input into a tool that generates an estimate. If the images are improperly identified, the tool may not be able to provide an estimate, or alternatively, provide an inaccurate estimate.

BRIEF DESCRIPTION OF THE DRAWINGS

The above needs are at least partially met through provision of the property damage estimator described in the following detailed description, particularly when studied in conjunction with the drawings, wherein.

Figure 1:
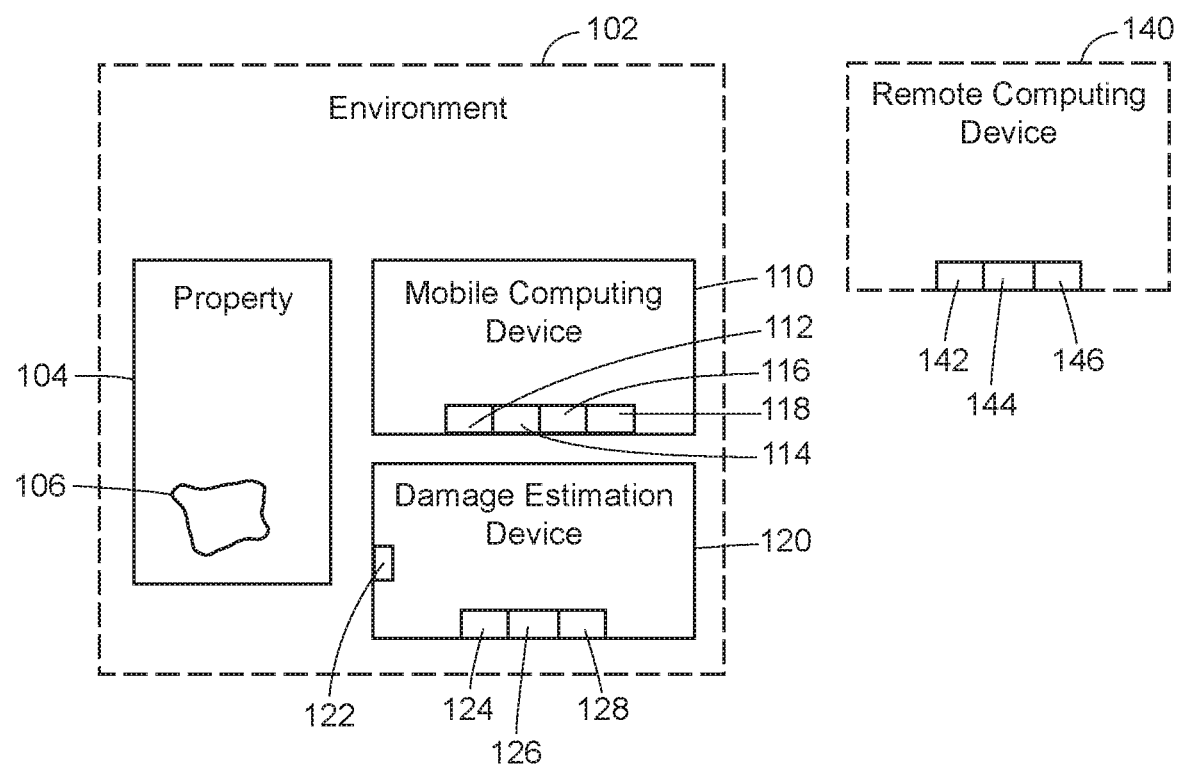
FIG. 1 comprises a block diagram of an exemplary system for estimating property damage in accordance with various embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

To assist in estimating property damage, an estimation system is described herein. The system may be used for assessing damage to any type of property having varying dimensions and characteristics, for example houses, shelters, commercial property, and the like. The system is capable of accessing otherwise hard or difficult to reach locations and generate an accurate visual representation of the property and the damage which is used to generate a repair estimate. Portions of the system may be controlled using a device, such as, for example a smartphone, and may work in numerous situations and environments.

Generally speaking, pursuant to these various embodiments, systems and approaches for estimating damage to a property, such as a household, are described. In one approach, a change estimation device is first activated using the mobile computing device. A damage estimation device may then capture any number of images of the damaged property. Using these captured images, the damage estimation device then calculates at least one characteristic of the damaged property as well as at least one characteristic of the damage to the property. A repair estimate is then calculated based at least on the characteristics of the damaged property and the damage to the property. The estimated quote is then transmitted.

So configured, inspectors are provided with a device that may be used to quickly and safely estimate damages to property. Furthermore, by using a mobile computing device to control operation of the system, repair estimates may be provided on-the-spot and may not need additional time for processing and further evaluation. Additionally, the accuracy of the roof measurements can be improved using computing device as opposed to manually-obtained measurements or measurements obtained through third party reports, which are frequently based on data obtained using manned aircraft flying several thousand feet above the ground.

Referring now to the drawings, and in particular to FIG. 1, a system 100 for estimating damage to a property may include an environment 102, a mobile computing device 110 at least partially disposed within the environment, and a damage estimation device 120. The system 100 may also include an optional remote computing device 140.

The environment 102 may have any number of properties 104 which may have damage 106 on a portion thereof. In some examples, the property 104 may be a household and the damage 106 may be to a roof of the household. The damage 106 may be structural, cosmetic, or any combination of the two. In an example, the damage 106 may be caused by severe weather such as hail or torrential downpours. The damage 106 may also be caused by other structures such as tree limbs or electrical lines. In some examples, the damage 106 may include holes, openings, and/or cracks to the roof, partially or entirely destroyed shingles, tiles, and/or membranes, and the like. Other examples of properties 104 and damage types are possible.

The mobile computing device 110 may be any type of mobile device capable of performing computing functions and transmitting data. In some examples, the mobile computing device 110 includes a processor 112, any number of inputs 114, a memory module 116, and a communications module 118. The processor 112 may be configured to control operation of the mobile computing device 110 and may be in communication with the inputs 114, memory module 116, and communications module 118. The memory module 116 may be any number of volatile and/or non-volatile computer readable storage modules (e.g., random access memory and flash drives, hard drives, etc.). The communications module 118 is adapted to communicate with any number of components using any type of wired and/or wireless communication approaches known to those skilled in the art. It is understood that the mobile computing device 110 can include any number of additional components to assist in executing tasks.

The damage estimation device 120 can be any type of device capable of capturing images of the property 104 and the damage 106. In an example, the damage estimation device 120 is any type of unmanned aerial vehicle, or "drone," capable of flying with varying amounts of autonomy. The damage estimation device 120 includes an imaging sensor 122 (e.g., a camera system) adapted to capture images of the property 104. The damage estimation device 120 can also include any number of processors 124 adapted to control operation thereof, a memory module 126 adapted to store data, and a communications module 128. It is understood that the damage estimation device 120 can include any number of additional components to assist in executing tasks.

The optional remote computing device 140 may be any type of computing device located remotely from the environment 102 and can include any number of computing devices and/or processors 142, communication modules 144, and memory modules 146. The optional remote computing device 140 may be adapted to receive and/or transmit data relating to the damage estimation with the mobile computing device 110 and/or the damage estimation device 120. For example, the optional remote computing device 140 may be a central processing server which receives captured images and data and subsequently calculates repair estimates based on the received information. It is understood that the remote computing device 140 can include any number of additional components to assist in executing tasks.

In operation, an inspector may use the mobile computing device 110 to activate the damage estimation device 120 by pressing any number of inputs 114. These inputs may consist of physical inputs such as buttons, toggles, and/or switches, any number of virtual inputs presented on a touch-screen display, or any combination thereof. The mobile computing device 110 then transmits a signal via the communications module 118 to the communications module 128 of the damage estimation device 120, whereby the processor 124 causes the damage estimation device 120 to capture images of the property 104 and the damage 106 using the imaging sensor 122. In an embodiment, the damage estimation device 120 automatically flies to a position near the damage 106 and captures images of the property 104 and the damage 106 from a number of different orientations.

In some examples, the damage estimation device 120 must be configured to capture images of a designated area. In these examples, a visual representation or map of the property 104 may be presented on the mobile computing device 110. This visual representation may be obtained via a number of approaches such as, for example, by accessing and retrieving geographical data associated with the property 104 or by manually providing a representative image thereof. A user can then select an area of the property 104 that the damage estimation device 120 will traverse to capture images. The user may select an entire area or use a number of waypoints which serve as boundaries for movement. Other examples are possible.

Using a sensor or sensors, the damage estimation device 120 can determine which direction portions of the property 104 are facing. The damage estimation device 120 may use data from a compass or any other device to append directional identifiers to the visual representation of the property 104 in addition to any images captured thereof. This information may be saved to image metadata, be used to name individual images, and/or may be visually represented on a portion of each individual image. Other examples are possible.

In some examples, the damage estimation device can generate an orthomosaic image of the property 104 and/or the damage 106 for subsequent inspection. This orthomosaic can be a number of successively captured images stitched together to form a larger image of the property 104 or a portion thereof.

Based on the captured images, any number of quantitative and/or qualitative characteristics of the damaged property 104 can be ascertained, measured, and/or calculated. In some examples, the user may select a number of the captured images to be used. The characteristics of the damaged property 104 can include overall dimensions of the property 104, height and slope measurements of various portions of the property 104 (e.g., the roof), a type of material used to construct various portions of the property 104, and an estimated age of the materials and/or the property. Other examples are possible. Similarly, any number of characteristics of the damage 106 can be ascertained based on the captured images. For example, the characteristics of the damage 106 can include size dimensions of the damaged area, an indication of the type of damage (e.g., holes, complete or partial absence of sections, cuts, indentations, and the like), and a severity rating of the damage 106. Other examples are possible.

In some approaches, the characteristics of the damaged property 104 and/or the characteristics of the damage 106 may be automatically determined using the captured images. In some examples, the damage estimation device 120 can include computer-executable instructions which use data from the captured images to generate values of the characteristics. In other examples, the captured images may be transmitted to the mobile computing device 110 and/or the remote computing device 140 which are then used to generate values of the characteristics. In yet other examples, any combination of the damage estimation device 120, the mobile computing device 110, and the remote computing device 140 may be used to generate particular values of the characteristics.

A number of approaches can be used to calculate quantitative characteristics of the damaged property 104 and/or the damage 106. For example, the imaging sensor 122 may capture, visualize, and/or view an image of a reference object having known dimensional properties (e.g., length, width, height, and the like) and compare these data to features of the property 104 and/or the damage 106. Accordingly, specific measurements of the property 104 and/or the damage 106 can be obtained by comparing the relative sizes of portions of the captured image and the reference object. Upon obtaining these values, an identifier descriptive of the data can be appended to the captured image to be used by the repair estimator.

In other examples, the damage estimation device 120 may be equipped with a number of additional sensors such as a global positioning system (GPS), a gyroscope, an altimeter, and the like. These sensors can automatically calculate values of measurements using approaches such as triangulation to obtain height and distance measurements and/or by comparing planar surfaces to a horizontal plane to obtain slope measurements of the roof and/or property. It is understood that any number of approaches to calculating measurement characteristics can be used. As stated, any combination of the mobile computing device 110, the damage estimation device 120, and the remote computing device 140 can be used to perform these calculations. Upon obtaining these values, an identifier descriptive of the data can be appended to the captured image to be used by the repair estimator. For example, by using GPS location, image metadata can be used to automatically capture directional values of characteristics such as roof slopes for input into the naming convention. Accordingly, a user will not need to manually caption the images.

Any number of systems and approaches can also be used to calculate qualitative characteristics of the damaged property 104 and/or the damage 106. For example, the mobile computing device 110, the damage estimation device 120, and/or the remote computing device 140 may have a database installed thereon having data relating to a number of different qualitative properties or characteristics of the property 104 and/or the damage 106. This data may include material colors, material types, types of damage, and the like. Other examples are possible. When the imaging sensor 122 captures images of the property 104 and/or the damage 106, thus obtaining the qualitative data relating thereto, the data from the captured image can be compared to the data contained in the database. When a suitable and/or an exact match is obtained, an identifier descriptive of the data can be appended to the captured image to be used by the repair estimator.

Upon generating values for the characteristics of the damaged property 104 and/or the damage 106, a repair estimate is calculated using these values. This repair estimate is generally based on a time required to repair the damage 106, a level of repair difficulty, material costs, repairperson availability and their typical service rates, and other factors. The repair estimate can then be transmitted to the user. For example, the repair estimate can be (i) calculated by the damage estimation device 120 and transferred to the communications module 118 of the mobile computing device via the communications module 128; (ii) calculated by the remote computing device 140 and transferred to the communications module 118 of the mobile computing device via the communications module 146; or (iii) calculated by the mobile computing device 110 itself. It is understood that any type of estimation system known by those having skill in the art may be used to generate the repair estimate. In any of these examples, the mobile computing device 110 can then display the repair estimate via a display or using any other suitable device or devices.

Figure 2:
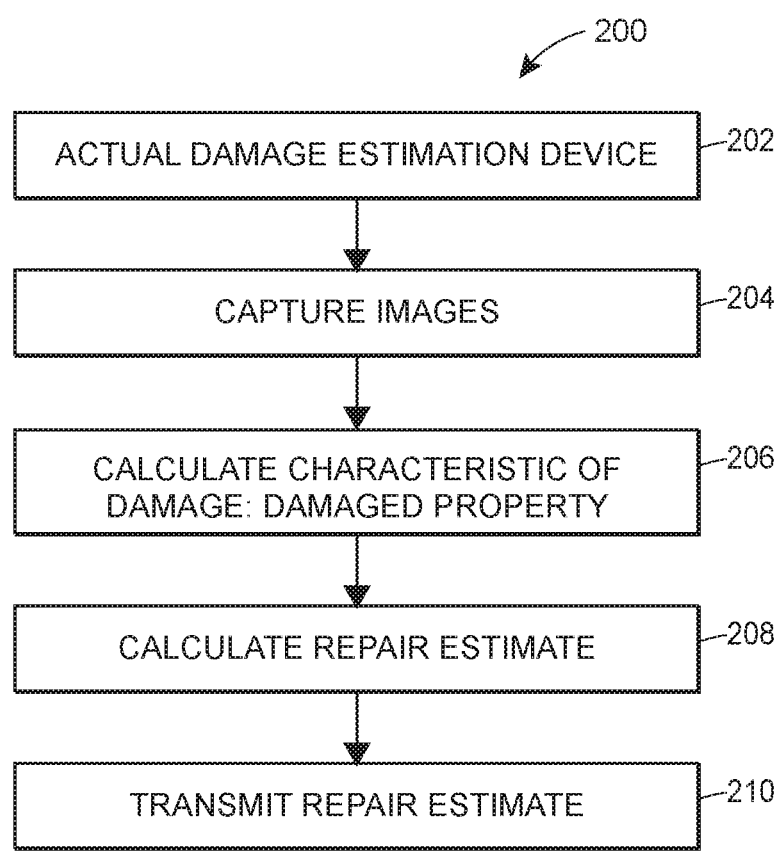
FIG. 2 comprises a flow diagram of an exemplary approach for estimating property damage in accordance with various embodiments.

Turning to FIG. 2, a method 200 for estimating damage to a damaged property is described. First, a damage estimation device is activated via at least one processor of a mobile computing device (block 202). In an embodiment, the damage estimation device includes an operating mode. It is understood that the damage estimation device may have other modes such as, for example, a learning mode, a test mode, and the like. Next, the damage estimation device captures a plurality of images of the damaged property and/or the damage (block 204). The damage estimation device may use any number of imaging sensors to capture the plurality of images. Any number of additional data may be captured using additional sensors. Next, a number of characteristics of the damaged property and/or the damage are calculated (block 206). The step of calculating the characteristics may use any known calculation technique and may include calculating both qualitative and quantitative data. A repair estimate is then calculated which uses the calculated characteristics (block 208). This repair estimate is then transmitted via one or more processors (block 210).

In an example, the step 204 of capturing images of the property may further include the generation of an orthomosaic of the property to be viewable for subsequent inspection. Particular images or portions of images may be selectable of this mosaic and can be used for the calculation of characteristics.

Figure 3:
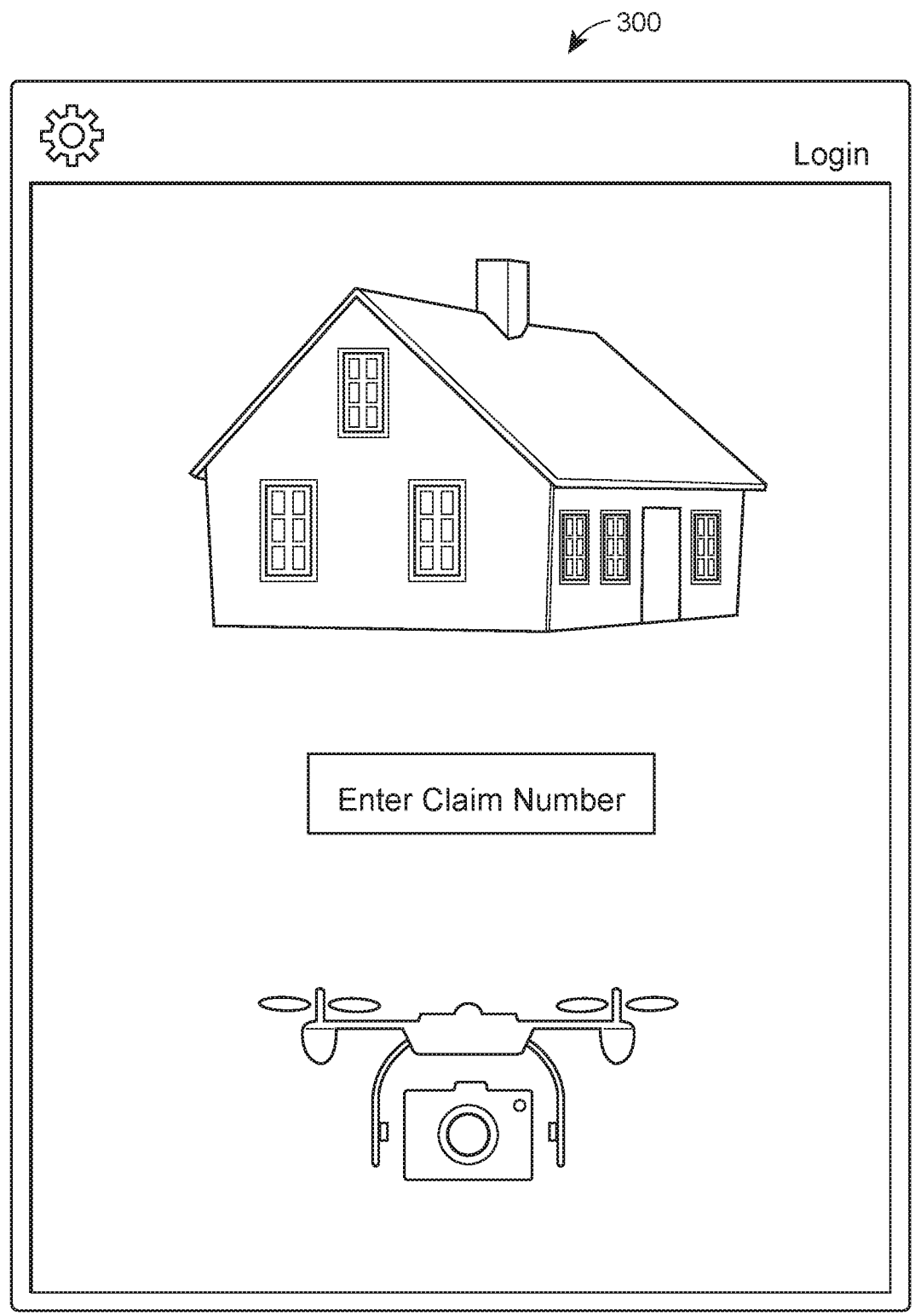
FIGS. 3-8 comprise illustrations of screenshots of an exemplary system for estimating property damage using a mobile device in accordance with various embodiments.
Figure 4:
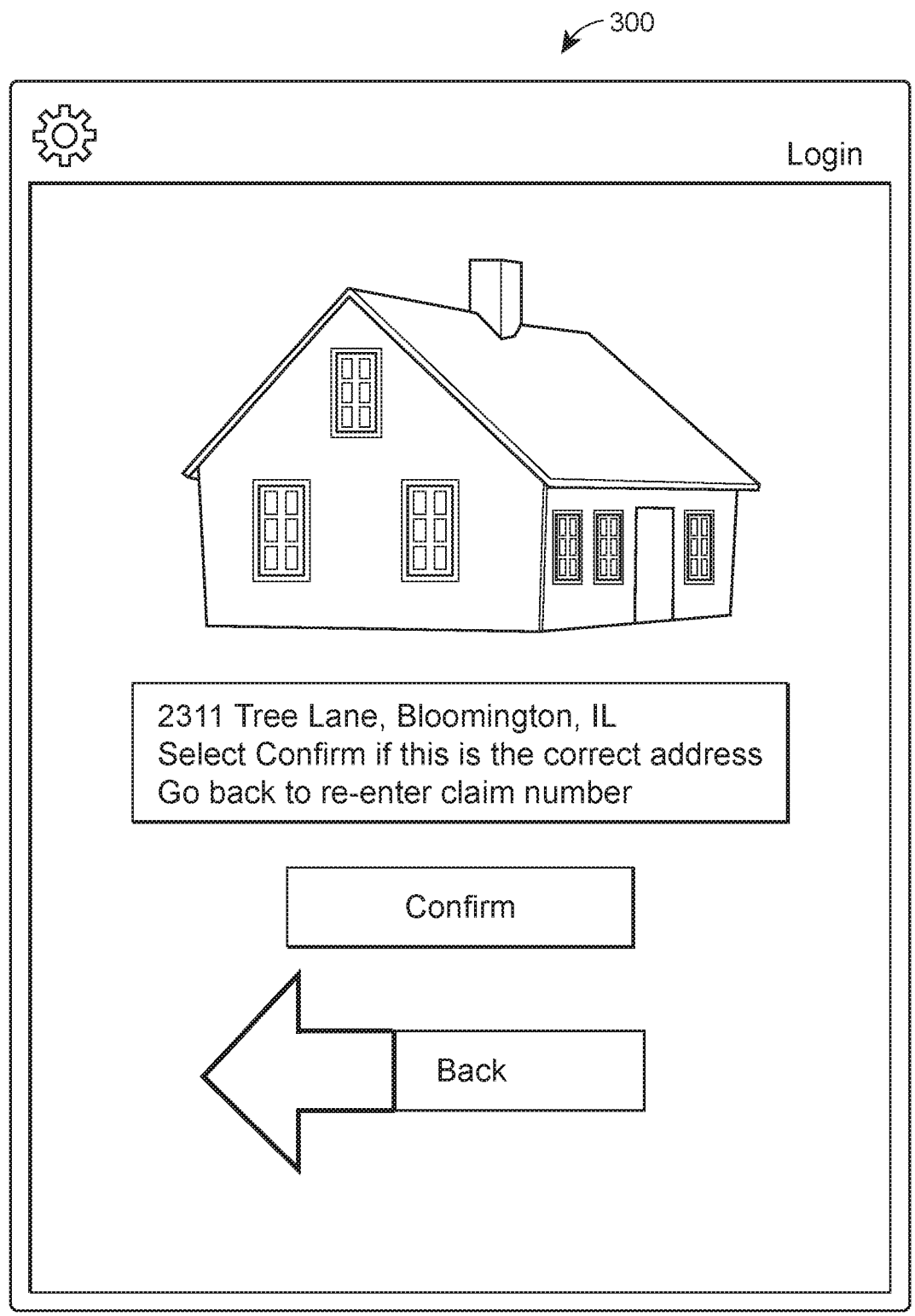

Turning to FIGS. 3-8, screenshots 300 of a system for estimating damage to a property are provided on a display of a portable computing device. In these examples, a user may first file a report indicating an occurrence of damage to their property using any number of approaches such as, for example, inputting information into an electronic database, contacting a representative via telephone, and the like. Upon receiving a notification of property damage, an inspector may travel to the property. As illustrated in FIG. 3, the user can first input a claim number corresponding to the damaged property seeking a repair estimate. In FIG. 4, a prompt is returned seeking confirmation of the property address associated with the entered claim number. In some examples (and not shown), a map or other visual representation may be displayed of the property as a way for the user to confirm they are at the correct location. The system may access a geographical data system to obtain this visual representation. After confirming the location, the damage estimation device may begin capturing images as well as calculating characteristics of the property and the damage.

Figure 5:
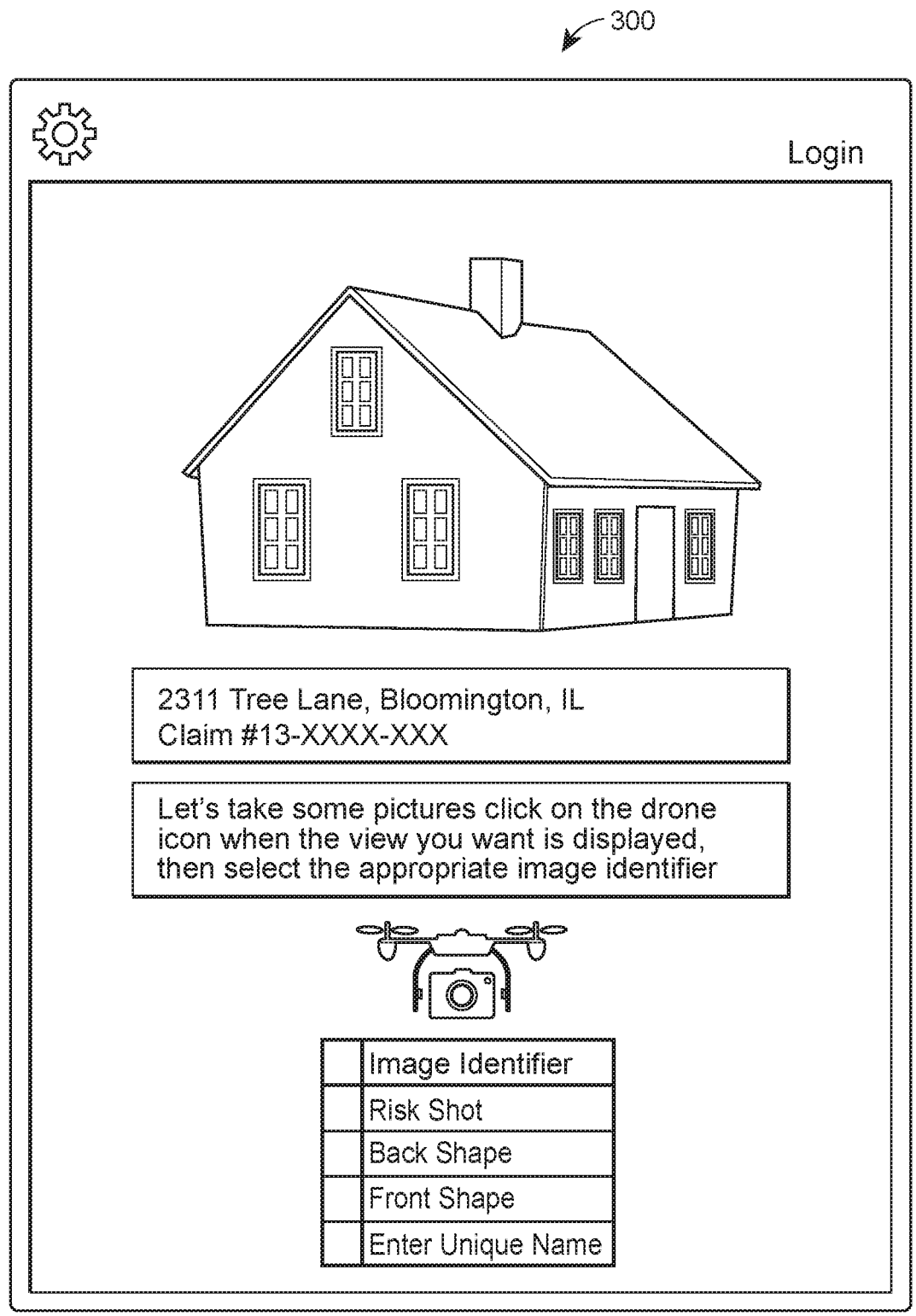
Figure 6:
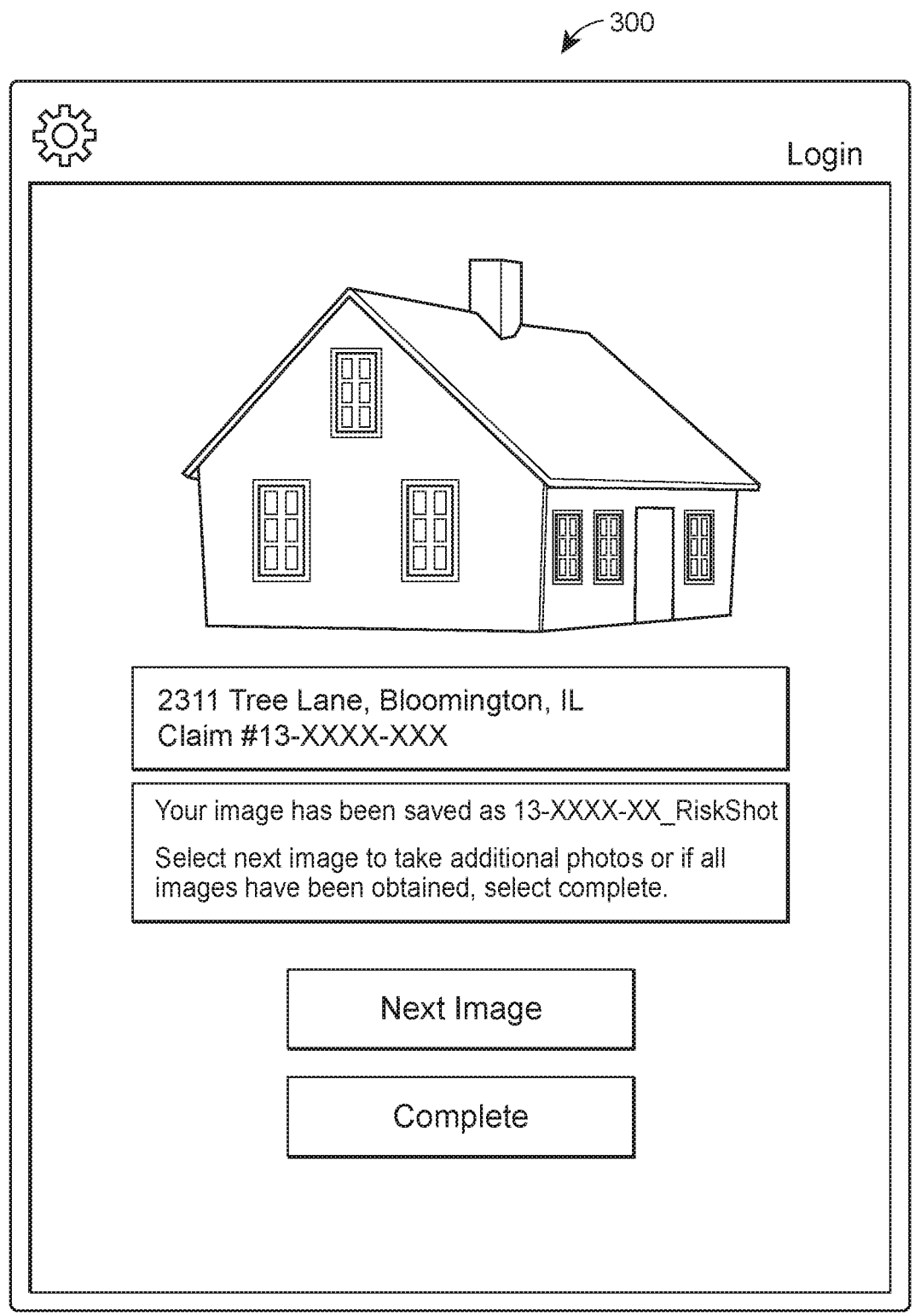
Figure 7:
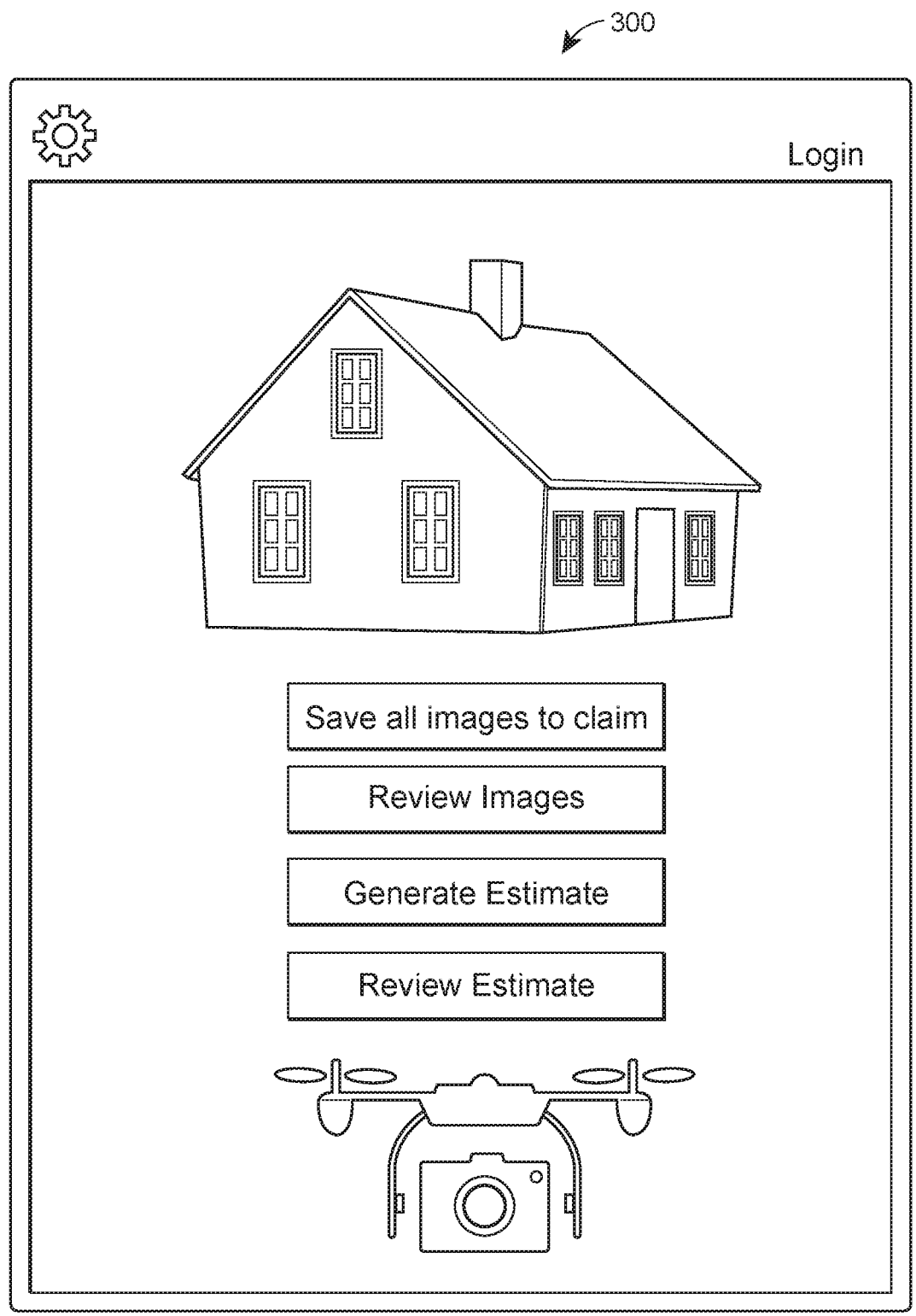
Figure 8:
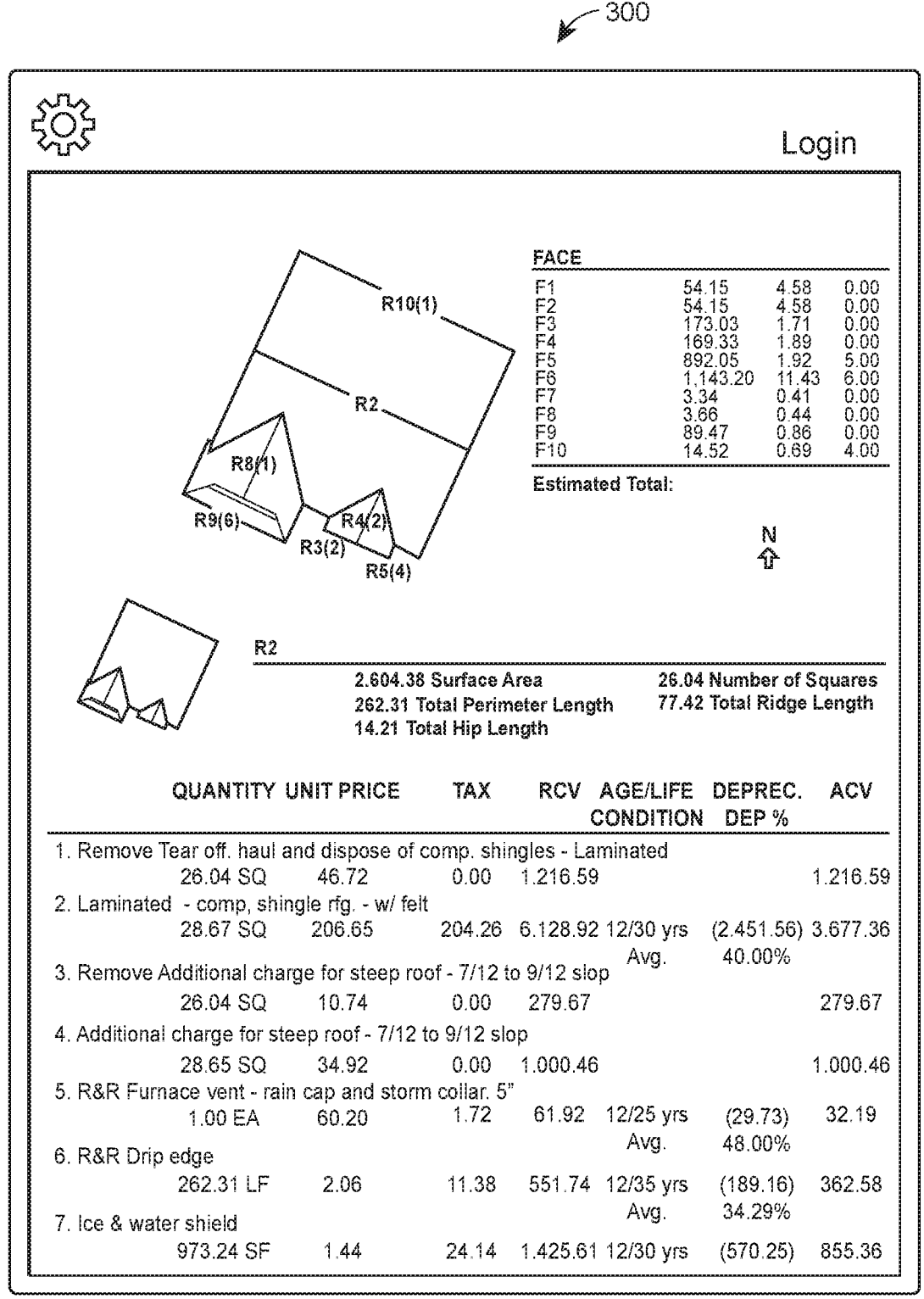

In FIG. 5, the system displays any number of images captured and transmitted from the damage estimation device and allows the user to manually append an image identifier, such as a directional coordinate, to the desired image. Upon selecting the desired identifier, and as shown in FIG. 6, the image is saved. The image's file name can include varying information such as the image identifier, the claim number, the date, and/or any other relevant information. In some examples, the system does not calculate the characteristics of the property and/or the damage until desired images are selected. As shown in FIG. 7, upon identifying all desired images, the system allows the user to save or review the selected images and/or generate or review the repair estimate. FIG. 8 illustrates a visualization of the completed repair estimate which provides a clear indication of measured characteristics, necessary work to be completed, repair costs, and any additional information.

Figure 9:
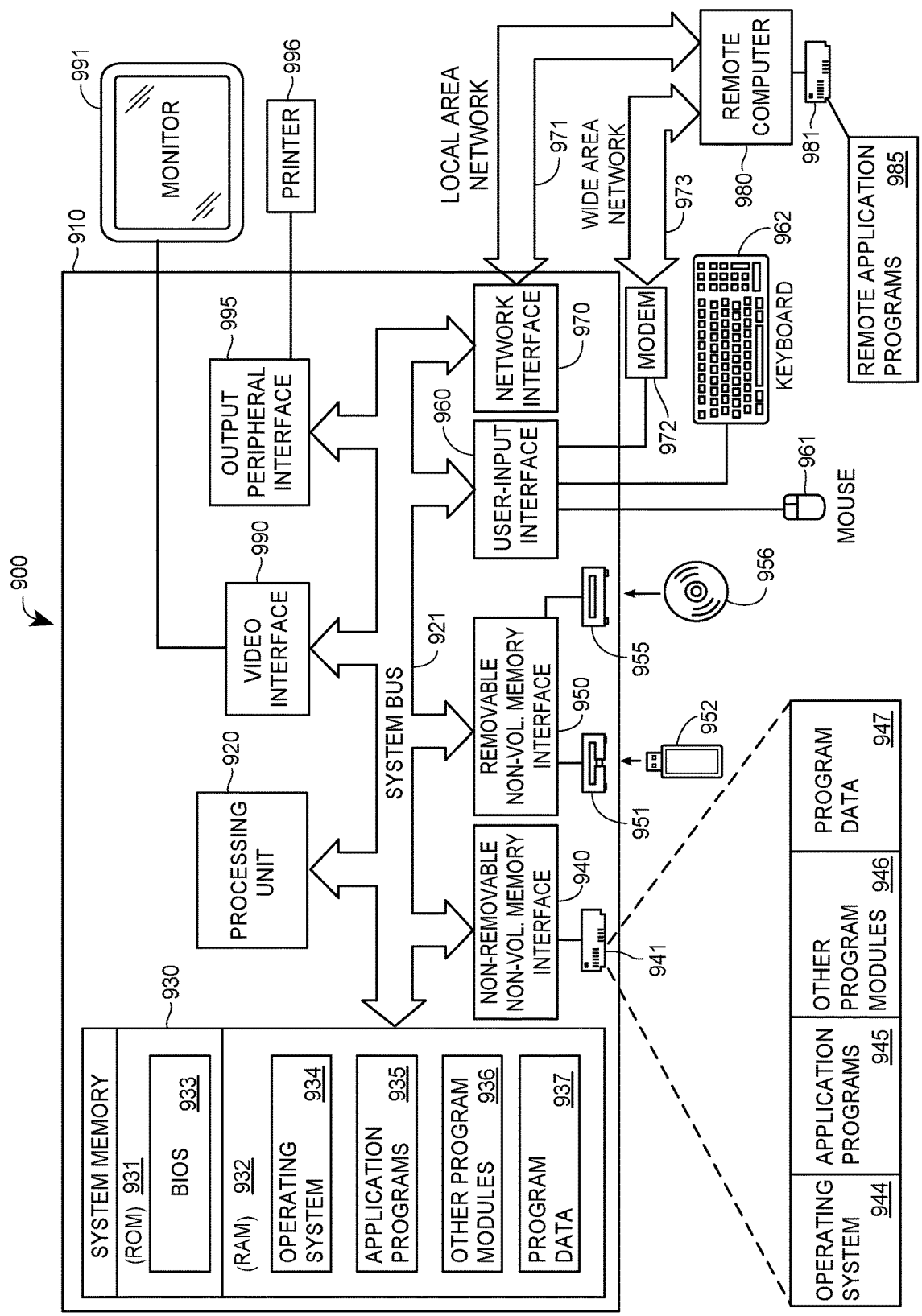
FIG. 9 comprises a block diagram of an exemplary computer system on which an approach for estimating property damage may operate in accordance with various embodiments.

Turning to FIG. 9, an exemplary computer system 900 in which an approach for estimating property damage in accordance with the described embodiments is provided. It is understood that the computer system 900 may be a more detailed description of the mobile computing device 110, the damage estimation system 120, and/or the remote computing device 140 as described herein. The computer system 900 of FIG. 9 includes a computing device in the form of a computer 910. Components of the computer 910 may include, but are not limited to, a processing unit 920, a system memory 930, and a system bus 921 that couples various system components, including the system memory to the processing unit 920. The system bus 921 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 910 typically includes a variety of computer-readable media. Computer-readable media can be any available media that can be accessed by computer 910 and includes both volatile and nonvolatile media, and both removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 930 includes computer storage media in the form of volatile and/or nonvolatile memory such as ROM 931 and RAM 932. A basic input/output system 933 (BIOS), containing the basic routines that help to transfer information between elements within the computer 910, such as during start-up, is typically stored in ROM 931. RAM 932 typically contains data and/or program modules that are immediately accessible to and/or presently being operated on by the processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9 provide storage of computer-readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and cursor control device 961, commonly referred to as a mouse, trackball or touch pad. A monitor 991 or other type of display device is also connected to the system bus 921 via an interface, such as a graphics controller 990. In addition to the monitor, computers may also include other peripheral output devices such as printer 996, which may be connected through an output peripheral interface 995.

The computer 910 may operate in a networked environment using logical connections to one or more remote computers, such as a remote computer 980. The remote computer 980 may be a personal computing device, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the input interface 960, or other appropriate mechanism. In a networked environment, program modules depicted relative to the computer 910, or portions thereof, may be stored in the remote memory storage device 981. By way of example, and not limitation, FIG. 9 illustrates remote application programs 985 as residing on memory device 981.

The communications connections 970, 972 allow the device to communicate with other devices. The communications connections 970, 972 are an example of communication modules, as discussed above.

Any of the methods of estimating repairs and generating these estimates that are described above may be implemented in part, or in their entirety, using one or more computer systems such as the computer system 900 illustrated in FIG. 9. For example, images may be captured during training and/or operating modes, as described above, by an imaging sensor (e.g., camera(s)) of the computer 910, or by an imaging sensor of each of one or more devices coupled to the computer 910 (e.g., coupled to system via a wired or wireless interface not shown in FIG. 9), and/or more specific property characteristic data may be entered via the keyboard 962 (and/or mouse 961) and user input interface 960. As another example, the processing unit 920 may cause the network interface 970 to send a notification, alert, and/or the estimate to a user (in the manner described above) via the WAN 973, LAN 971, and/or one or more other networks.

Some or all calculations performed in the embodiments described above may be performed by a computer such as the computer 910, and more specifically may be performed by a processor such as the processing unit 920, for example. In some embodiments, some calculations may be performed by a first computer such as the computer 910 while other calculations may be performed by one or more other computers such as the remote computer 980. The calculations may be performed according to instructions that are part of a program such as the application programs 935

So configured, a damage repair estimation system can allow a user to effectively estimate damage in a semi- or fully-autonomous manner. By using the mobile computing device, the user can quickly identify relevant images of the property and/or damage, which are then used to automatically determine characteristics thereof.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A method of estimating damage to a damaged property, the method comprising:
   activating a damage estimation device using a mobile computing device, the damage estimation device comprising an unmanned aerial vehicle having an imaging sensor coupled thereto;
   determining, via at least one sensor coupled with the damage estimation device, directional data of the damaged property to generate at least one directional identifier indicating a facing direction of the damaged property;
   capturing, via the imaging sensor of the unmanned aerial vehicle, a plurality of images of the damaged property;
   appending the at least one directional identifier to at least one of the plurality of images of the damaged property;
   calculating (i) at least one characteristic of the damaged property selected from the group consisting of a roof height measurement, a roof slope measurement, a construction material, and an estimated age from the plurality of captured images; and (ii) at least one characteristic of the damage selected from the group consisting of a damage type, a damaged area dimension, and a damage severity rating from the plurality of captured images;
   calculating a repair estimate based at least on the at least one characteristic of the damaged property and the at least one characteristic of the damage; and
   transmitting, by one or more processors, the repair estimate.

2. The method of claim 1, wherein the damage estimation device generates an orthomosaic of the damaged property for subsequent inspection.

3. The method of claim 1, wherein the roof slope measurement is obtained via triangulation using a known height above a ground level.

4. The method of claim 1, further comprising accessing geographical data to verify a location of the damaged property.

5. The method of claim 1, further comprising applying an identifier to each of the plurality of images.

6. The method of claim 1, further comprising selecting at least one image from the plurality of captured images to be used to calculate the at least one characteristic of the damaged property and the at least one characteristic of the damage.

7. The method of claim 1, wherein capturing the plurality of images includes designating, on a virtual map of the damaged property, a plurality of waypoints to constrain motion of the damage estimation device.

8. A damage estimation system, the system comprising:
   a mobile computing device; and
   a damage estimation device communicatively coupled to the mobile computing device, the damage estimation device comprising an unmanned aerial vehicle having at least one imaging sensor coupled thereto;
   wherein upon activating the damage estimation device via the mobile computing device, the damage estimation device is adapted to:
   determine, via at least one sensor coupled therewith, directional data of the damaged property to generate at least one directional identifier indicating a facing direction of the damaged property;
   capture a plurality of images of damage to a damaged property using the at least one imaging sensor,
   append the at least one directional identifier to the plurality of images;
   calculate at least one characteristic of the damaged property from the plurality of captured images, the at least one characteristic of the damaged property selected from the group consisting of a roof height measurement, a roof slope measurement, a construction material, and an estimated age, and
   calculate at least one characteristic of the damage from the plurality of captured images, the at least one characteristic of the damage selected from a group consisting of a damage type, a damaged area dimension, and a damage severity rating,
   wherein the system is adapted to calculate a repair estimate based at least on the at least one characteristic of the damaged property and the at least one characteristic of the damage.

9. The damage estimation system of claim 8, the system further being adapted to transmit the estimated quote to the mobile computing device.

10. The damage estimation system of claim 8, wherein the damage estimation device is adapted to generate an orthomosaic of the damaged property for subsequent inspection.

11. The damage estimation system of claim 8, wherein the imaging sensor is adapted to automatically apply an identifier to each of the plurality of images.

12. A non-transitory computer-readable storage medium comprising computer-readable instructions to be executed on one or more processors of a system for estimating damage to a property, the instructions when executed causing the one or more processors to:

activate a damage estimation device comprising an unmanned aerial vehicle having an imaging sensor coupled thereto;

determine, via at least one sensor coupled therewith, directional data of the damaged property to generate at least one directional identifier indicating a facing direction of the damaged property;

capture a plurality of images of the damaged property using the imaging sensor of the unmanned aerial vehicle;

append the at least one directional identifier to the plurality of images; using the damage estimation device, calculate (i) at least one characteristic of the property from the plurality of captured images, the at least one characteristic of the property selected from the group consisting of a roof height measurement, a roof slope measurement, a construction material, and an estimated age, and (ii) at least one characteristic of the damage to the property from the plurality of captured images, the at least one characteristic of the damage selected from the group consisting of a damage type, a damaged area dimension, and a damage severity rating;

calculate a repair estimate based at least on the at least one characteristic of the damaged property and the at least one characteristic of the damage; and cause the estimated quote to be transmitted.

13. The non-transitory computer readable storage medium of claim 12, wherein the instructions when executed cause the damage estimation device to generate an orthomosaic of the damaged property.

* * * * *